(12) United States Patent
Vanghi (10) Patent No.: US 9,154,928 B2
(45) Date of Patent: Oct. 6, 2015

(54) APPARATUS AND METHODS FOR IMPLEMENTING DUAL-SIM CROSS-DIVERT IN DSDS WIRELESS DEVICES

(75) Inventor: Vieri Vanghi, Lazio (IT)

(73) Assignee: QUALCOMM Incorporated, San Diego, CA (US)

( * ) Notice: Subject to any disclaimer, the term of this patent is extended or adjusted under 35 U.S.C. 154(b) by 675 days.

(21) Appl. No.: 13/525,897

(22) Filed: Jun. 18, 2012

(65) Prior Publication Data

US 2013/0337792 A1 Dec. 19, 2013

(51) Int. Cl.
 *H04W 4/16* (2009.01)
 *H04M 1/00* (2006.01)
 *H04M 3/42* (2006.01)

(52) U.S. Cl.
 CPC . *H04W 4/16* (2013.01); *H04M 1/00* (2013.01); *H04M 3/42* (2013.01)

(58) Field of Classification Search
 CPC ....................................................... H04W 4/16
 USPC ................................................. 455/417–450
 See application file for complete search history.

(56) References Cited

U.S. PATENT DOCUMENTS

| 2007/0281687 | A1 | 12/2007 | Jiang |
| 2008/0064443 | A1 | 3/2008 | Shin et al. |
| 2009/0215491 | A1* | 8/2009 | Hou et al. ..................... 455/558 |
| 2010/0029273 | A1 | 2/2010 | Bennett |
| 2011/0012987 | A1 | 1/2011 | Yoon |
| 2011/0142223 | A1 | 6/2011 | Hua et al. |
| 2012/0135715 | A1* | 5/2012 | Kang et al. ................. 455/412.1 |

FOREIGN PATENT DOCUMENTS

| WO | WO-2008040848 A1 | 4/2008 |
| WO | WO-2012041663 A1 | 4/2012 |

OTHER PUBLICATIONS

International Search Report and Written Opinion—PCT/US2013/046430—ISA/EPO—Oct. 30, 2013.
TELTARIF: "Erste Eindrucke: Mit dem Dual-SIM-Handy unterwegs", Internet Citation, Mar. 14, 2007, pp. 1-9, XP002508367, Retrieved from the Internet: URL: http://www.teltarif.de/gb/arch/2007/kw11/s25274:1.html [retrieved on Dec. 16, 2008] pp. 1-3.

* cited by examiner

*Primary Examiner* — Michael T Vu
(74) *Attorney, Agent, or Firm* — Donald C. Kordich (57) ABSTRACT

Presented herein are methods and apparatuses for improved control of cross divert functionality in dual-SIM dual-standby (DSDS) wireless devices. According to example methods and apparatuses presented herein, a dual-SIM dual-standby device may receive a command to exit cross-divert mode, obtain a first phone number associated with a first subscription on the DSDS device and a second phone number associated with a second subscription on the DSDS device as a result of receiving the command, enable and/or disable Call Forward Not Reachable services for both the first subscription and the second subscription, activate and/or deactivate call waiting services associated with each of the first subscription and the second subscription, and forward a call from one subscription to another subscription of the DSDS device. As such, less user-intensive control of cross divert in DSDS devices is attainable.

24 Claims, 6 Drawing Sheets

APPARATUS AND METHODS FOR IMPLEMENTING DUAL-SIM CROSS-DIVERT IN DSDS WIRELESS DEVICES

BACKGROUND

1. Field

Aspects of the present disclosure relate generally to wireless communication systems, and more particularly to processing communications related to multiple subscriptions.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless networks, a user equipment (UE) can have multiple subscriptions to one or more networks (e.g., by employing multiple subscriber identity module (SIM) cards or otherwise). Such a UE may include, but is not limited to, a dual-SIM, dual standby (DSDS) device. For example, a first subscription may support a first technology standard, such as Wideband Code Division Multiple Access (WCDMA), while a second subscription may support a second technology standard, such as Global System for Mobile Communications (GSM) Enhanced Data rates for GSM Evolution (EDGE) (also referred to as GERAN). Where the UE utilizes a single transceiver to communicate over the multiple subscriptions and/or networks, the UE can tune the transceiver to a given subscription and/or network during a given period of time to communicate therewith, but can only communicate in a single subscription and/or network at a given period of time.

Furthermore, where the first subscription is engaged in an active data or voice call in a DSDS device and the second subscription receives a voice call page, the voice call is diverted to the voicemail of the second subscription. Therefore, in legacy DSDS operation, the device user is unable to receive the second subscription call while engaged in an ongoing data or voice session on the first subscription.

A workaround for this problem, referred to as X-Divert (cross-divert), has been developed wherein if the first subscription is engaged in an active data or voice call the user may receive a call waiting message on the first subscription indicating the presence of call forwarded from the second subscription. To implement this functionality, the user must be highly involved. Specifically, the user must manually register for Call Forward Not Reachable (CFNRc) using the phone number of each subscription as the forward-to number for the other subscription, must manually activate CFNRc, and manually activate call waiting (CW) for each subscription. This process requires extensive user intervention and several user interface options and interactions. Furthermore, the steps required to implement this functionality require a user who understands nuances of wireless communications systems and the settings that would allow for such a workaround.

Therefore, improvements in the operation of the tune away mode are desired to allow less user-intensive configuration of X-Divert functionality DSDS devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to aspects presented herein, provided is a method of operation in a dual-SIM dual-standby (DSDS) device, including receiving, at the DSDS device, a command to enter cross-divert mode, obtaining a first phone number associated with a first subscription on the DSDS device and a second phone number associated with a second subscription on the DSDS device as a result of receiving the command, activating Call Forward Not Reachable services for both the first subscription and the second subscription, wherein the DSDS device sets a first forward-to phone number associated with the first subscription to the second phone number and sets a second forward-to phone number associated with the second subscription to the first phone number, and enabling call waiting services associated with each of the first subscription and the second subscription.

Further presented herein is a method of operation in a DSDS device, which includes receiving, at the DSDS device, a command to exit cross-divert mode, obtaining a first phone number associated with a first subscription on the DSDS device and a second phone number associated with a second subscription on the DSDS device as a result of receiving the command, disabling Call Forward Not Reachable services for both the first subscription and the second subscription, and deactivating call waiting services associated with each of the first subscription and the second subscription.

In addition, provided herein is an example computer program product for communicating with multiple subscriptions, which includes a computer-readable medium including at least one instruction for causing a computer to receive, at the DSDS device, a command to enter cross-divert mode, at least one instruction for causing a computer to obtain a first phone number associated with a first subscription on the DSDS device and a second phone number associated with a second subscription on the DSDS device as a result of receiving the command, at least one instruction for causing a computer to activate Call Forward Not Reachable services for both the first subscription and the second subscription, wherein the DSDS device sets a first forward-to phone number associated with the first subscription to the second phone number and sets a second forward-to phone number associated with the second subscription to the first phone number, and at least one instruction for causing a computer to enable call waiting services associated with each of the first subscription and the second subscription.

Aspects of the present description also provide for a computer program product for communicating with multiple subscriptions, which includes a computer-readable medium itself including at least one instruction for causing a computer to receive a command to exit cross-divert mode, at least one instruction for causing a computer to obtain a first phone number associated with a first subscription on a DSDS device and a second phone number associated with a second subscription on the DSDS device as a result of receiving the command, at least one instruction for causing a computer to disable Call Forward Not Reachable services for both the first subscription and the second subscription, and at least one instruction for causing a computer to deactivate call waiting services associated with each of the first subscription and the second subscription.

Further presented herein is an example apparatus for communicating with multiple subscriptions, which includes means for receiving a command to enter cross-divert mode, means for obtaining a first phone number associated with a first subscription on a DSDS device and a second phone number associated with a second subscription on the DSDS device as a result of receiving the command, means for activating Call Forward Not Reachable services for both the first subscription and the second subscription, wherein the DSDS device sets a first forward-to phone number associated with the first subscription to the second phone number and sets a second forward-to phone number associated with the second subscription to the first phone number, and means for enabling call waiting services associated with each of the first subscription and the second subscription.

Further presented herein is an apparatus for communicating with multiple subscriptions, which includes means for receiving a command to exit cross-divert mode, means for obtaining a first phone number associated with a first subscription on a DSDS device and a second phone number associated with a second subscription on the DSDS device as a result of receiving the command, means for disabling Call Forward Not Reachable services for both the first subscription and the second subscription, and means for deactivating call waiting services associated with each of the first subscription and the second subscription.

According to further aspects presented herein, described is a user equipment apparatus, which includes a processor configured to receive a command to enter cross-divert mode, obtain a first phone number associated with a first subscription on a DSDS device and a second phone number associated with a second subscription on the DSDS device as a result of receiving the command, activate Call Forward Not Reachable services for both the first subscription and the second subscription, wherein the DSDS device sets a first forward-to phone number associated with the first subscription to the second phone number and sets a second forward-to phone number associated with the second subscription to the first phone number, and enable call waiting services associated with each of the first subscription and the second subscription.

Further presented herein is a user equipment apparatus, which includes a processor configured to receive a command to exit cross-divert mode, obtain a first phone number associated with a first subscription on the DSDS device and a second phone number associated with a second subscription on the DSDS device as a result of receiving the command, disable Call Forward Not Reachable services for both the first subscription and the second subscription, and deactivate call waiting services associated with each of the first subscription and the second subscription.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure presents methods and apparatuses for improved X-Divert operation in DSDS wireless devices, wherein a toggle control on a user interface allows the user to automatically switch in and out of X-Divert mode. In other words, according to the present disclosure, "activate" or "deactivate" options may be presented to the user and there is no manual configuration requirement for the X-Divert user.

According to aspects of the present disclosure, methods are presented for activating and deactivating X-Divert in a DSDS device. First, where X-Divert is inactive and a user toggles X-Divert to active in a user interface, the device may obtain phone line numbers corresponding to both subscriptions by either querying the network for the numbers or obtaining the numbers from device memory. Furthermore, the device may register and activate both subscriptions for CFNRc and may set each forward-to number as the number of the opposite subscription in the DSDS device. Additionally, the device may activate call waiting on both subscriptions. As such, the DSDS device may then operate in X-Divert mode without intensive user setup.

Additionally, a DSDS device according to the disclosure may deactivate X-Divert in a DSDS device where a user toggles X-Divert to off Upon this command, the device may obtain the phone numbers corresponding to each subscription on the DSDS device, may deactivate call waiting on both subscriptions, and may deregister CFNRc on both subscriptions as well. Thus, the DSDS device may then operate out of X-Divert mode without intensive user intervention.

In an additional aspect, the device may perform the above-stated methods using applicable short codes according to 3GPP standards in the case of at least one of the subscription networks being one of UMTS or GSM, or using the operator-specific short codes obtained from a local database in the case of at least one of the subscription networks being CDMA.

Figure 1:
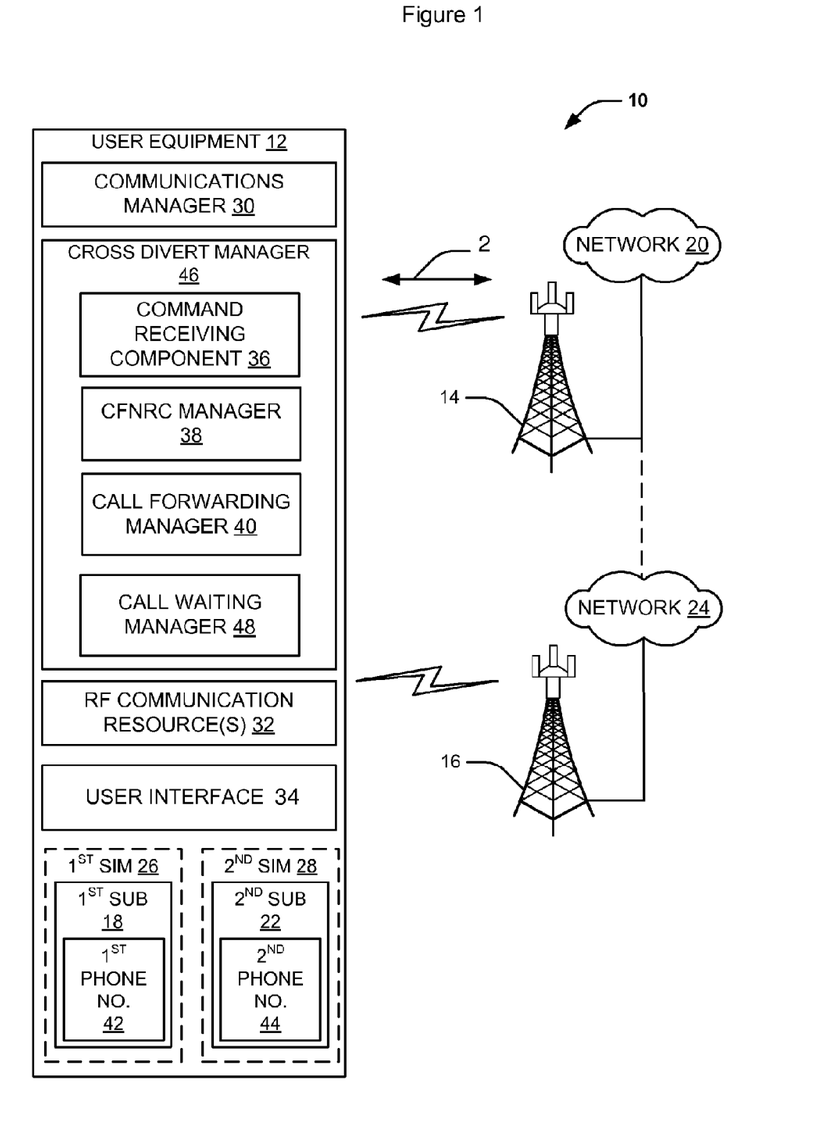
FIG. 1 is a schematic diagram of a communication network including aspects of a DSDS-enabled UE.

Referring to FIG. 1, in one aspect, a wireless communication system 10 includes a user equipment (UE) 12 for performing a improved X-Divert. For instance, UE 12 can communicate with a first base station 14 and/or a second base station 16 utilizing multiple subscriptions to one or more networks. In an example, UE 12 can have a first subscription 18 related to first network 20 and second subscription 22 related to the same network, such as first network 20, or to a different network, such as second network 24. For instance, each subscription 18 and 22 may relate to a different account and/or different services on the same network or on different networks. Furthermore, each subscription may have one or more related phone numbers, such as first phone number 42 for first subscription 18 and second phone number 44 for second subscription 22. In some aspects, each subscription 18 and 22 optionally may be maintained on a respective first subscriber identity module (SIM) 26 and a second SIM 28. As such, in one aspect, UE 12 may be a multi-SIM, multi-standby device, such as a dual-SIM, dual standby (DSDS) device. Accordingly, UE 12 can at least communicate in first network 20 via a first base station 14 using first subscription 18. Moreover, UE 12 can communicate in second network 24 via first base station 14 and/or via a different base station, such as second base station 16, using second subscription 22. Further, first network 20 and second network 24 can use the same or different radio access technologies (RAT) to facilitate communicating with UEs. Additionally, first base station 14 and second base station 16 can each be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access via a subscription at the UE 12.

UE 12 can include a communications manager component 30 configured to manage communication exchange signaling associated with first subscription 18 and/or second subscription 22 via one or more radio frequency (RF) communication resources 32. For example, communications manager component 30 may include and execute communication protocols and/or manage other standards-specific communication procedures using protocol- and/or standards-specific instructions and/or subscription-specific configuration information that allows communications with first network 20 and second network 24. Further, RF communication resources 32 are configured to transmit and/or receive the communication exchange signaling to and/or from one or more base stations or other devices in wireless communication system 10. For example, RF communication resources 32 may include, but are not limited to, one or more of a transmitter, a receiver, a transceiver, protocol stacks, transmit chain components, and receive chain components. In some aspects, RF communication resources 32 may be dedicated to operate according to the standards and procedures of a single one of first subscription 18 or second subscription 22 at any given time. For instance, although not to be construed as limiting, RF communication resources 32 may be associated with a multi-SIM, multi-standby device, such as a dual-SIM, dual standby (DSDS) device. In an aspect, communications manager component 30 may manage multi-network communication to enable mobility of UE 12, e.g. for a handover, and/or to seek to add to or improve communication quality and/or services. In one case, for example, communications manager component 30 may establish an active call 2 using first subscription 18 with one network wireless network, for example first network 20, while attempting to acquire and/or maintain communication and/or service using second subscription 22 with the same network or with a different network, such as second network 24. According to an example, communications manager component 30 can establish active call 2 over first network 20, related to first subscription 18, via first base station 14. For instance, UE 12 and base station 14 can establish a connection to facilitate communicating in first network 20. Communications between UE 12 and first base station 14 can occur over logical channels, as described herein for example. UE 12 can activate the call based on requesting call establishment from base station 14, receiving a page for an incoming call from base station 14, etc. Moreover, for example, active call 2 can be a data call (e.g., voice over internet protocol (VoIP) or similar technologies) where the first network 20 is a packet-switched (PS) network, a voice call where first network 20 is a circuit-switched (CS) network, and/or the like.

In an additional aspect, UE 12 may include a cross divert manager 46, which may be configured to carry out improved X-Divert functionality on UE 12. For example, cross divert manager 46 may include a command receiving component, which may be configured to receive one or more commands, such as a command to enter or exit a X-Divert mode, from a user via user interface 34. Additionally, cross divert manager 46 may include a CFNRc manager 38, which may configured to activate and/or deactivate Call Forward Not Reachable services for the first subscription 18 and/or the second subscription 22.

Furthermore, cross divert manager 46 may include a call forwarding manager 40, which may be configured to set a forward-to number for one or both of first subscription 18 and/or second subscription 22. In an aspect, this forward-to number may be first phone number 42 or second phone number 44. In a further aspect, the call forwarding manager 40 may obtain the forward-to number several ways. In some aspects, the call forwarding manager 40 can obtain the forward-to number when elementary files are provisioned by the operator that sold and/or configured the SIM card(s) on UE 12 or locally stored in UE memory, by (a) looking up a Mobile Subscriber ISDN Number (MSISDN) in a SIM card, such as first SIM 26 or second SIM 28, (b) looking up MSISDNs stored in local phone memory, such as a memory 62 (FIG. 2), (c) looking up MSISDNs corresponding to one or more International Mobile Subscriber Identities (IMSIs) retrieved from Universal Subscriber Identity Modules (USIMs). Furthermore, in an aspect, where the elementary files are not provisioned by the operator that sold and/or configured the SIM card(s) on UE 12 or not stored on local UE memory, or options (a)-(d) above are not otherwise available, cross divert manager 46 or a component therein may (1) prompt the user via user interface 34 to input the requested phone numbers via an input means; (2) use the inputted numbers for performing X-Divert; and/or (3) store the inputted phone number(s) with another unique identifier (e.g. IMSI(s)) in local memory (e.g. memory 62 of FIG. 2), which may be a non-volatile memory for later use by UE 12.

Furthermore, upon receipt of a call or call page for one phone number, the call forwarding manager 40 may forward the call to the other phone number.

In addition, cross divert manager 46 may include a call waiting manager, which may be configured to enable and/or disable call waiting services for one or both of the first subscription 18 and/or the second subscription 22.

UE 12 may additionally include a user interface component 34 operable to receive inputs from a user of UE 12, and further operable to generate outputs for presentation to the user. User interface component 34 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 34 may include one or more output devices, including but not limited to a display, a speaker, a haptic feedback mechanism, a printer, any other mechanism capable of presenting an output to a user, or any combination thereof. In an aspect, user interface component 34 may include a button or virtual button, such as a toggle button, which may allow a user to enable or disable cross divert with a single action, such as pressing the toggle button. Once this button has been pushed, the UE may activate or deactivate cross divert services.

Figure 2:
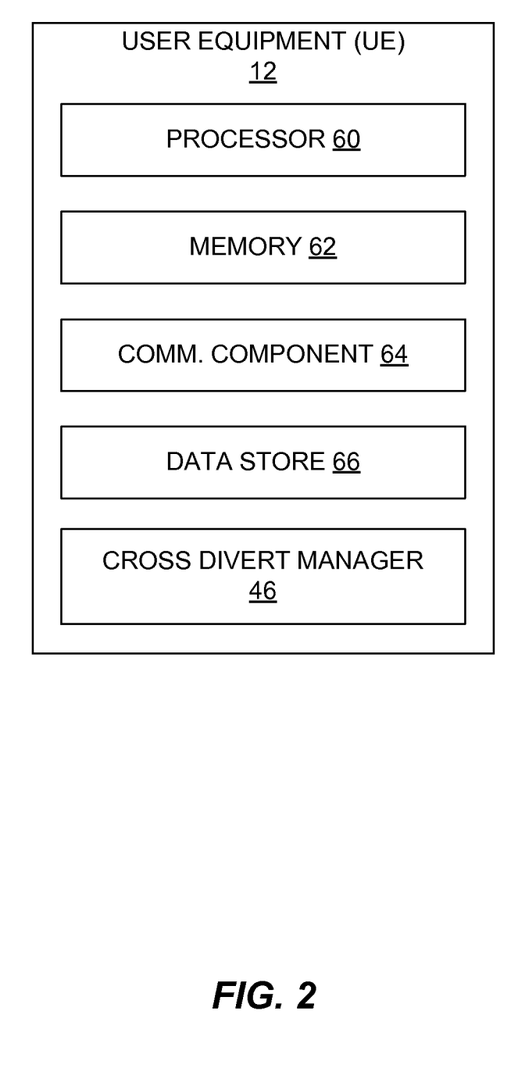
FIG. 2 is a block diagram presenting aspects of a UE according to the present disclosure.

Referring to FIG. 2, in one aspect, UE 12 may include a specially programmed or configured computer device. UE 12 includes a processor 60 for carrying out processing functions associated with one or more of components and functions described herein. Processor 60 can include a single or multiple set of processors or multi-core processors. Moreover, processor 60 can be implemented as an integrated processing system and/or a distributed processing system. Additionally, processor 60 may be configured to perform the functions described herein related to enabling and/or disabling X-Divert on the UE 12.

UE 12 further includes a memory 62, such as for storing data used herein and/or local versions of applications being executed by processor 60. Memory 62 can include any type of memory usable by a computer, such as random access memory (RAM), read only memory (ROM), tapes, magnetic discs, optical discs, volatile memory, non-volatile memory, and any combination thereof. Additionally, memory 62 may be configured to store data and/or code or computer-readable instructions for performing the functions described herein related to enabling and/or disabling X-Divert on the UE 12.

Further, UE 12 includes a communications component 64 that provides for establishing and maintaining communications with one or more entities utilizing one or more of hardware, software, and services as described herein. Communications component 64 may carry communication signals between components on UE 12, as well as exchanging communication signals between UE 12 and external devices, such as devices located across a wired or wireless communications network and/or devices serially or locally connected to UE 12. For example, communications component 64 may include one or more buses, and may further include transmit chain components and receive chain components associated with a transmitter and receiver, respectively, or a transceiver, operable for interfacing with external devices. In an additional aspect, communications component 64 may be configured to perform the functions described herein related to enabling and/or disabling X-Divert on the UE 12.

Additionally, UE 12 may further include a data store 66, which can be any suitable combination of hardware and/or software, that provides for mass storage of information, databases, and programs employed in connection with aspects described herein. For example, data store 66 may be a data repository for applications and data not currently being executed by processor 60, such as those related to the aspect described herein. Furthermore, UE 12 may include cross divert manager 46, such as in specially programmed computer readable instructions or code, firmware, hardware, one or more processor modules, or some combination thereof.

Figure 3:
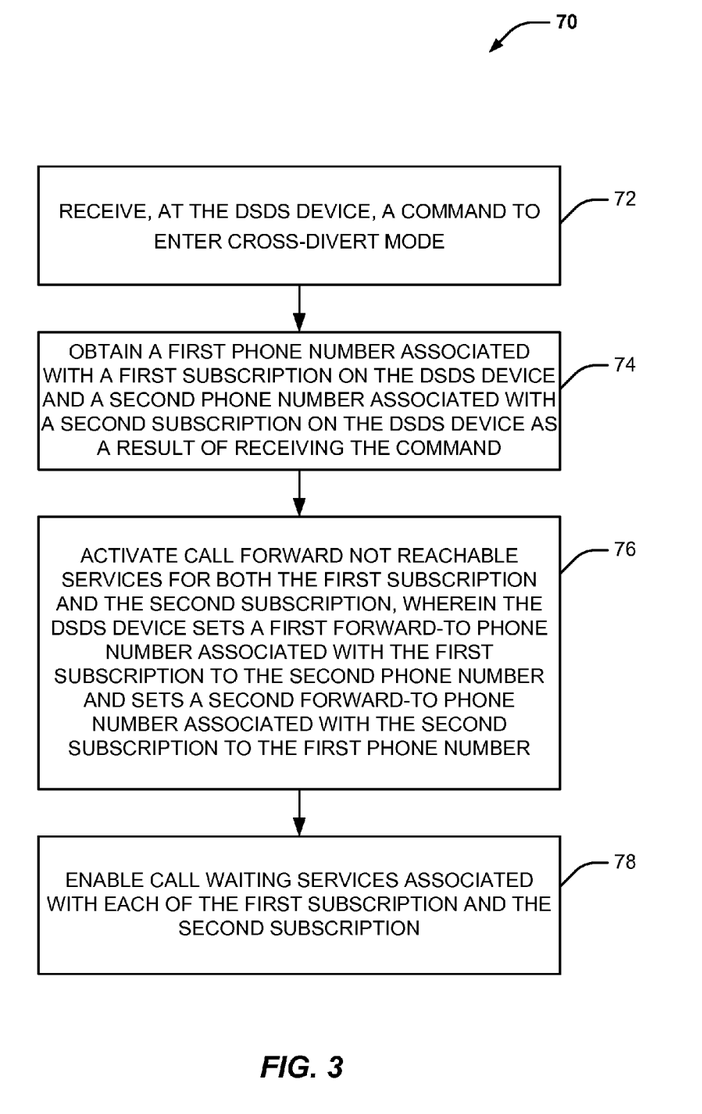
FIG. 3 is a flowchart of an aspect of a method of X-Divert control in a DSDS UE.

Referring to FIG. 3, in operation, a UE such as UE 12 (FIG. 1) may perform one aspect of a method 70 for improved X-Divert control. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of inter-related states or events, such as in a state diagram. Moreover, not all illustrated acts may be required to implement a method in accordance with one or more features described herein.

In an aspect, at block 72, a DSDS device may receive a command to enter cross-divert mode. This command may be entered by a user via a button or toggle on a user interface, for example. Furthermore, at block 74, the device may obtain a first phone number associated with a first subscription on the DSDS device and a second phone number associated with a second subscription on the DSDS device as a result of receiving the command. In addition, at block 76, the device may activate Call Forward Not Reachable (CFNRc) services for both the first subscription and the second subscription. In doing so, the DSDS device may set a first forward-to phone number associated with the first subscription to the second phone number and sets a second forward-to phone number associated with the second subscription to the first phone number. Moreover, at block 78, the device may enable call waiting services associated with each of the first subscription and the second subscription. In addition, the device may utilize Third Generation Partnership Project (3GPP) and/or operator-specific short codes on at least one of the first subscription and the second subscription to carry out these aspects.

Figure 4:
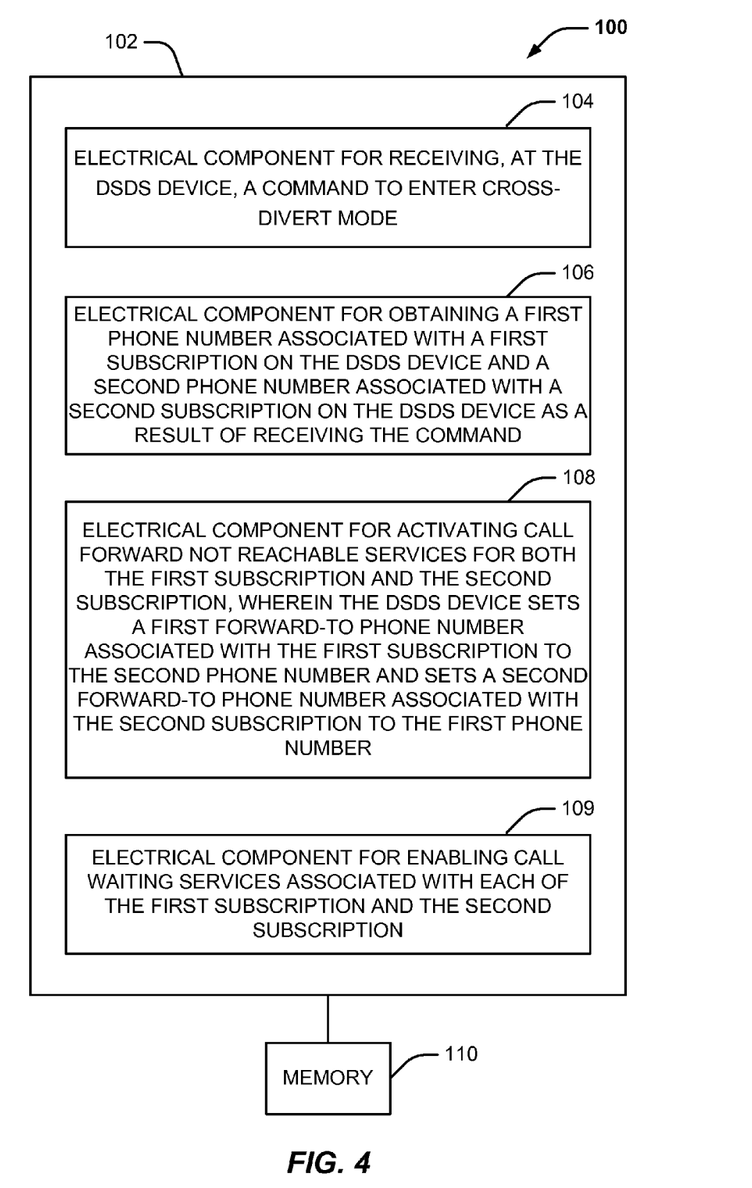
FIG. 4 is a component block diagram of aspects of a DSDS UE according to the present disclosure.

Referring to FIG. 4, an example system 100 is displayed for improved X-Divert control in a DSDS device. For example, system 100 can reside at least partially within a user equipment, such as UE 12 (FIG. 1). It is to be appreciated that system 100 is represented as including functional blocks, which can be functional blocks that represent functions implemented by a processor, software, or combination thereof (e.g., firmware). System 100 includes a logical grouping 102 of electrical components that can act in conjunction. For instance, logical grouping 102 can include an electrical component 104 for receiving a command to enter cross-divert mode. In an aspect, electrical component 104 may include command receiving component 36 or a component thereof (FIG. 1). In addition, logical grouping 102 can include an electrical component 106 for obtaining a first phone number associated with a first subscription on the DSDS device and a second phone number associated with a second subscription on the DSDS device as a result of receiving the command. In an aspect, electrical component 106 may include cross divert manager 46 or a component thereof (FIG. 1). Furthermore, logical grouping 102 can include an electrical component 108 for activating CFNRc services for both the first subscription and the second subscription. In an aspect, electrical component 108 may include CFNRc manager 38 or a component thereof (FIG. 1). Furthermore, logical grouping 102 can include an electrical component 109 for enabling call waiting services associated with each of the first and second subscriptions. In an aspect, electrical component 109 may include call waiting manager 48 or a component thereof (FIG. 1).

In one example, electrical components 104, 106, 108, and 109 can comprise at least one processor, or each electrical component 104, 106, 108, and 109 can be a corresponding module of at least one processor. Moreover, in an additional or alternative example, electrical components 104, 106, 108, and 109 can be a computer program product including a computer readable medium, where each electrical component 104, 106, 108, and 109 can be corresponding code or instructions.

Additionally, system 100 can include a memory 110 that retains instructions for executing functions associated with the electrical components 104, 106, 108, and 109, stores data used or obtained by the electrical components 104, 106, 108, and 109, etc. While shown as being external to memory 110, it is to be understood that one or more of the electrical components 104, 106, 108, and 109 can exist within memory 110.

Figure 5:
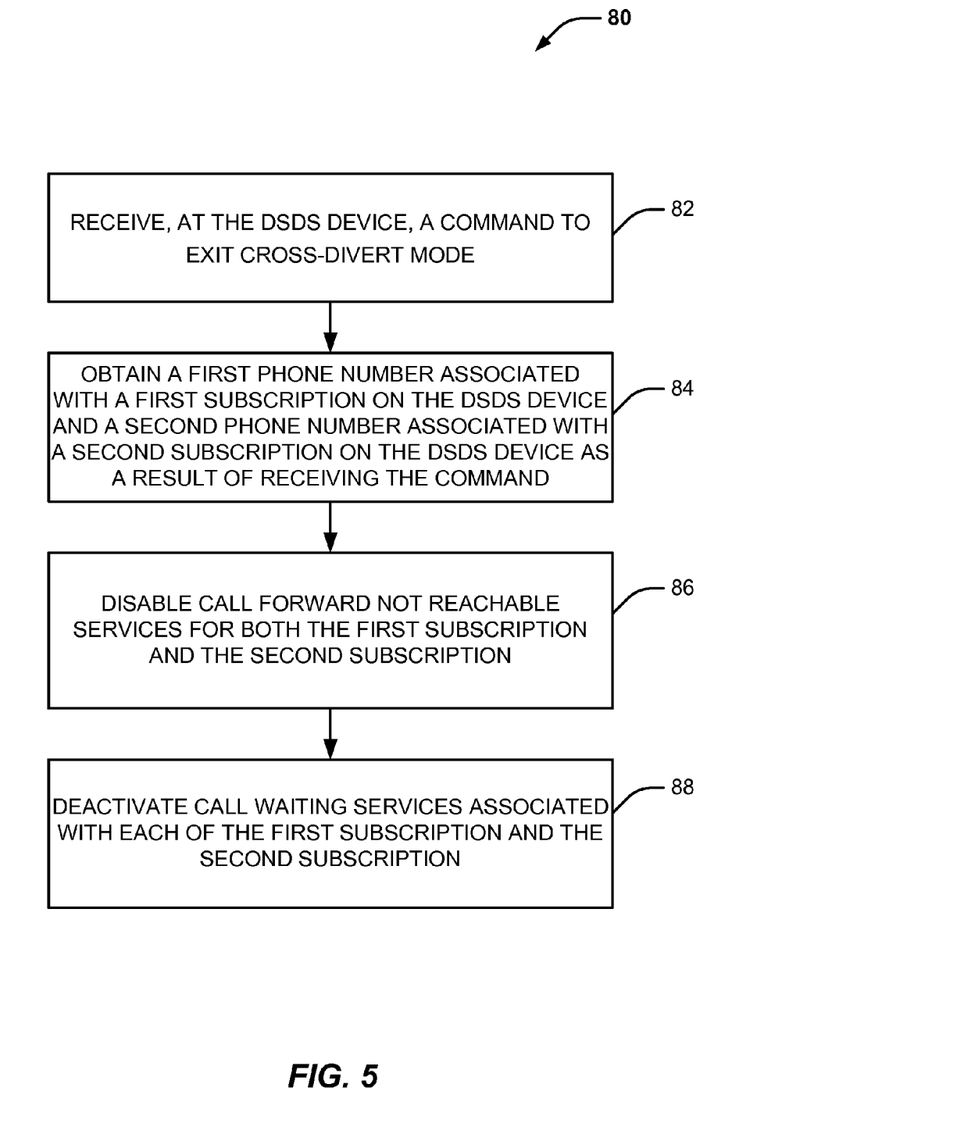
FIG. 5 is a flowchart of an aspect of a method of X-Divert control in a DSDS UE.

Referring to FIG. 5, in operation, a UE such as UE 12 (FIG. 1) may perform one aspect of a method 80 for improved X-Divert control. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 82, a UE (e.g. a DSDS device) may receive a command to exit cross-divert mode. Furthermore, at block 84, the UE may obtain a first phone number associated with a first subscription on the DSDS device and a second phone number associated with a second subscription on the DSDS device as a result of receiving the command. Additionally, at block 86, the UE may disable Call Forward Not Reachable services for both the first subscription and the second subscription. Moreover, at block 88, the UE may deactivate call waiting services associated with each of the first subscription and the second subscription. In additional aspects, the device may utilize Third Generation Partnership Project (3GPP) and/or operator-specific short codes on at least one of the first subscription and the second subscription to carry out these aspects.

Figure 6:
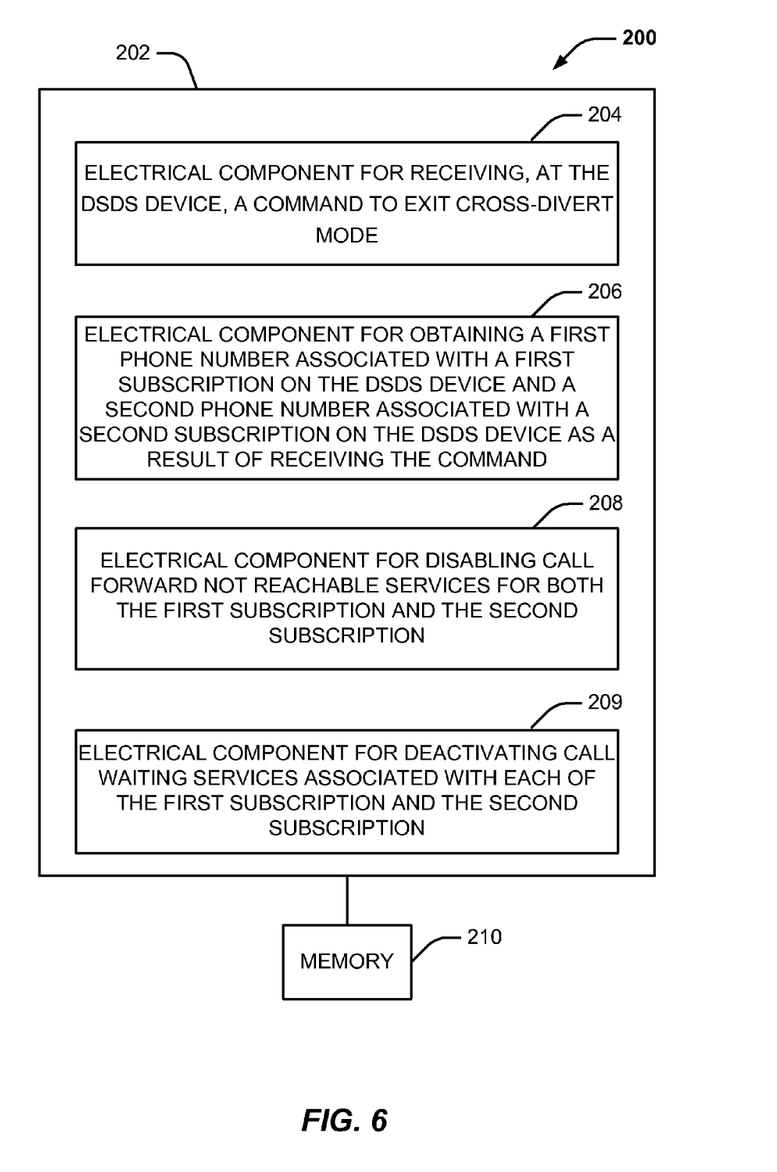
FIG. 6 is a component block diagram of aspects of a DSDS UE according to the present disclosure.

Referring to FIG. 6, an example system 200 is displayed for improved X-Divert control in a DSDS UE. For example, system 200 can reside at least partially within a user equipment, such as UE 12 (FIG. 1). It is to be appreciated that system 200 is represented as including functional blocks, which can be functional blocks that represent functions implemented by a processor, software, or combination thereof (e.g., firmware). System 200 includes a logical grouping 202 of electrical components that can act in conjunction. For instance, logical grouping 202 can include an electrical component 204 for receiving a command to exit cross-divert mode. In an aspect, electrical component 204 may include command receiving component 36 or a component thereof (FIG. 1). In addition, logical grouping 202 can include an electrical component 206 for obtaining a first phone number associated with a first subscription on the DSDS device and a second phone number associated with a second subscription on the DSDS device as a result of receiving the command. In an aspect, electrical component 206 may include cross divert manager 46 or a component thereof (FIG. 1). Furthermore, logical grouping 202 can include an electrical component 208 for disabling Call Forward Not Reachable services for both the first subscription and the second subscription. In an aspect, electrical component 208 may include CFNRc manager 38 or a component thereof (FIG. 1). Furthermore, logical grouping 202 can include an electrical component 209 for deactivating call waiting services associated with each of the first subscription and the second subscription. In an aspect, electrical component 209 may include call waiting manager 48 or a component thereof (FIG. 1).

In one example, electrical components 204, 206, 208, and 209 can comprise at least one processor, or each electrical component 204, 206, 208, and 209 can be a corresponding module of at least one processor. Moreover, in an additional or alternative example, electrical components 204, 206, 208, and 209 can be a computer program product including a computer readable medium, where each electrical component 204, 206, 208, and 209 can be corresponding code or instructions.

Additionally, system 200 can include a memory 210 that retains instructions for executing functions associated with the electrical components 204, 206, 208, and 209, stores data used or obtained by the electrical components 204, 206, 208, and 209, etc. While shown as being external to memory 210, it is to be understood that one or more of the electrical components 204, 206, 208, and 209 can exist within memory 210.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2. Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of operation in a dual-SIM dual-standby (DSDS) device, comprising:
    receiving, at the DSDS device, a command to enter cross-divert mode;
    obtaining a first phone number associated with a first subscription on the DSDS device and a second phone number associated with a second subscription on the DSDS device as a result of receiving the command;
    activating Call Forward Not Reachable services for both the first subscription and the second subscription, wherein the DSDS device sets a first forward-to phone number associated with the first subscription to the second phone number and sets a second forward-to phone number associated with the second subscription to the first phone number; and
    enabling call waiting services associated with each of the first subscription and the second subscription.

2. The method of claim 1, wherein the DSDS device performs the method using Third Generation Partnership Project short codes on at least one of the first subscription or the second subscription.

3. The method of claim 1, wherein the DSDS device performs the method using operator-specific short codes on at least one of the first subscription or the second subscription.

4. A method of operation in a dual-SIM dual-standby (DSDS) device, comprising:
receiving, at the DSDS device, a command to exit cross-divert mode;
obtaining a first phone number associated with a first subscription on the DSDS device and a second phone number associated with a second subscription on the DSDS device as a result of receiving the command;
disabling Call Forward Not Reachable services for both the first subscription and the second subscription; and
deactivating call waiting services associated with each of the first subscription and the second subscription.

5. The method of claim 4, wherein the DSDS device performs the method using Third Generation Partnership Project short codes on at least one of the first subscription or the second subscription.

6. The method of claim 4, wherein the DSDS device performs the method using operator-specific short codes on at least one of the first subscription or the second subscription.

7. A computer program product for communicating with multiple subscriptions, comprising:
a non-transitory computer-readable medium comprising:
at least one instruction for causing a computer to receive a command to enter cross-divert mode;
at least one instruction for causing a computer to obtain a first phone number associated with a first subscription on a DSDS device and a second phone number associated with a second subscription on the DSDS device as a result of receiving the command;
at least one instruction for causing a computer to activate Call Forward Not Reachable services for both the first subscription and the second subscription, wherein the DSDS device sets a first forward-to phone number associated with the first subscription to the second phone number and sets a second forward-to phone number associated with the second subscription to the first phone number; and
at least one instruction for causing a computer to enable call waiting services associated with each of the first subscription and the second subscription.

8. The computer program product of claim 7, wherein the computer-readable medium utilizes Third Generation Partnership Project short codes on at least one of the first subscription or the second subscription.

9. The computer program product of claim 7, wherein the computer-readable medium utilizes operator-specific short codes on at least one of the first subscription or the second subscription.

10. A computer program product for communicating with multiple subscriptions, comprising:
a non-transitory computer-readable medium comprising:
at least one instruction for causing a computer to receive a command to exit cross-divert mode;
at least one instruction for causing a computer to obtain a first phone number associated with a first subscription on a DSDS device and a second phone number associated with a second subscription on the DSDS device as a result of receiving the command;
at least one instruction for causing a computer to disable Call Forward Not Reachable services for both the first subscription and the second subscription; and
at least one instruction for causing a computer to deactivate call waiting services associated with each of the first subscription and the second subscription.

11. The computer program product of claim 10, wherein the computer-readable medium utilizes Third Generation Partnership Project short codes on at least one of the first subscription or the second subscription.

12. The computer program product of claim 10, wherein the computer-readable medium utilizes operator-specific short codes on at least one of the first subscription or the second subscription.

13. An apparatus for communicating with multiple subscriptions, comprising:
means for receiving a command to enter cross-divert mode;
means for obtaining a first phone number associated with a first subscription on a DSDS device and a second phone number associated with a second subscription on the DSDS device as a result of receiving the command;
means for activating Call Forward Not Reachable services for both the first subscription and the second subscription, wherein the DSDS device sets a first forward-to phone number associated with the first subscription to the second phone number and sets a second forward-to phone number associated with the second subscription to the first phone number; and
means for enabling call waiting services associated with each of the first subscription and the second subscription.

14. The apparatus of claim 13, further comprising means for using Third Generation Partnership Project short codes on at least one of the first subscription or the second subscription.

15. The apparatus of claim 13, further comprising means for using operator-specific short codes on at least one of the first subscription or the second subscription.

16. An apparatus for communicating with multiple subscriptions, comprising:
means for receiving a command to exit cross-divert mode;
means for obtaining a first phone number associated with a first subscription on a DSDS device and a second phone number associated with a second subscription on the DSDS device as a result of receiving the command;
means for disabling Call Forward Not Reachable services for both the first subscription and the second subscription; and
means for deactivating call waiting services associated with each of the first subscription and the second subscription.

17. The apparatus of claim 16, further comprising means for using Third Generation Partnership Project short codes on at least one of the first subscription or the second subscription.

18. The apparatus of claim 16, further comprising means for using operator-specific short codes on at least one of the first subscription or the second subscription.

19. A user equipment apparatus, comprising:
a processor configured to:
receive a command to enter cross-divert mode;
obtain a first phone number associated with a first subscription on a DSDS device and a second phone number associated with a second subscription on the DSDS device as a result of receiving the command;
activate Call Forward Not Reachable services for both the first subscription and the second subscription, wherein the DSDS device sets a first forward-to phone number associated with the first subscription to the second phone number and sets a second forward-to phone number associated with the second subscription to the first phone number; and enable call waiting services associated with each of the first subscription and the second subscription.

20. The apparatus of claim 19, wherein the processor is further configured to use Third Generation Partnership Project short codes on at least one of the first subscription or the second subscription.

21. The apparatus of claim 19, wherein the processor is further configured to use operator-specific short codes on at least one of the first subscription or the second subscription.

22. A user equipment apparatus, comprising:
a processor configured to:
receive, at the DSDS device, a command to exit cross-divert mode;
obtain a first phone number associated with a first subscription on the DSDS device and a second phone number associated with a second subscription on the DSDS device as a result of receiving the command;
disable Call Forward Not Reachable services for both the first subscription and the second subscription; and
deactivate call waiting services associated with each of the first subscription and the second subscription.

23. The apparatus of claim 22, wherein the processor is further configured to use Third Generation Partnership Project short codes on at least one of the first subscription or the second subscription.

24. The apparatus of claim 22, wherein the processor is further configured to use operator-specific short codes on at least one of the first subscription or the second subscription.

* * * * *